Re. 24877

May 6, 1958　　J. F. MASTANTUONO ET AL　　2,833,104
GRASS CATCHER MEANS
Filed Feb. 25, 1957

INVENTORS.
JOHN F. MASTANTUONO
FRANK VILARDI

2,833,104
GRASS CATCHER MEANS
John F. Mastantuono, Cedarhurst, and Frank Vilardi, Oceanside, N. Y.

Application February 25, 1957, Serial No. 642,099

1 Claim. (Cl. 56—202)

This invention relates to means for catching grass from a lawn mower and more particularly to such means of rigid integral construction.

Grass catchers are used in cutting lawns since the cuttings would otherwise lie on top of the cut grass and rot and tend to choke the lawn, causing browning and dead spots in the lawn.

Conventional grass catchers are generally constructed of a metal bottom with canvas sides. Applicants have found that this construction does not provide the necessary rigidity for proper adjustment. The canvas catchers are very difficult to adjust and tend to bounce and droop. The canvas tends to become water soaked and stretches, causing the bottom to drag along the ground, which disfigures the lawn and also wears out the catcher.

Also the canvas catchers are difficult to mount and demount from the mower when loaded without spilling the contents. Also during the cutting they tend to shift and bounce causing spilling of the contents and making it difficult to control the mower. These difficulties are rather annoying and troublesome so that many people prefer to rake up the cuttings rather than use the catchers.

Accordingly, a principal object of the invention is to provide new and improved grass catcher means for lawn mowers.

Another object of the invention is to provide new and improved grass catcher means for lawn mowers having rigid construction.

Another object of the invention is to provide grass catchers having integral one piece, all metal, construction.

Another object of the invention is to provide grass catcher means which is easy to mount and demount from the mower which may be rapidly connected thereto with a minimum amount of adjustment.

These and other objects of the invention will be apparent from the following specification and drawings, of which:

Figures 1, 2, 3:
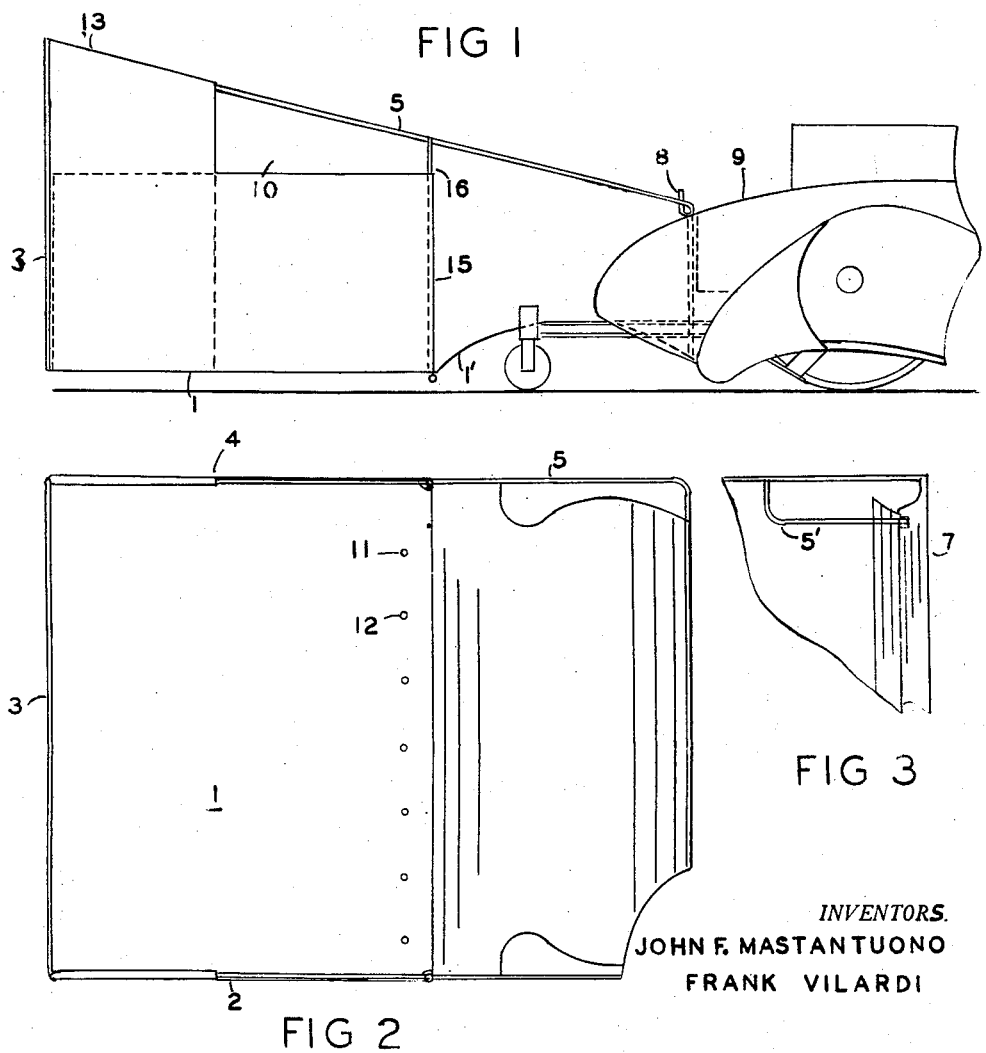
Figure 1 is a side view of an embodiment of the invention illustrating the use thereof.
Figure 2 is a plan view of the embodiment of Figure 1.
Figure 3 is a fragmentary vertical front view of Figure 2.

Referring to the figures, the catcher comprises a bottom portion 1 and three side portions 2, 3, and 4. The forward part of the bottom 1 has a curved surface 1' which acts as a gate or barrier to retain the cuttings inside the catcher. The bottom and side portions 1, 2, 3, and 4 are preferably made from a single piece of metal such as sheet metal, which is folded up into the desired shape and mounted on a rod 5 which has a general U shape in horizontal view and extends all around the upper edge of the catcher. The rod 5, additionally, is bent around at the front at the point 5', see vertical view, Figure 3 and extends down and underneath the lower front lip 7 of the bottom member on each side thereof and bolted thereto. The curved portion of the rod 5 at the point 5' and a corresponding curve on the other side, not shown, are adapted to engage hooks 8 mounted on the power mower 9. The rod 5 extends down in front, and its lower portion rests against the mower frame. This provides an easy and simple method of mounting the catcher. Aperture 10, Figure 1 and a corresponding aperture on the other side are provided to give hand holes on the rod 5 for the purpose of mounting and demounting the catcher. Drainage holes 11 and 12 etc. are provided in the bottom member 1 to drain out any excess water and thereby lighten the load. The curved forward portion 1' of the bottom member is curved in at each side, as shown by the curves in top and bottom of Figure 2, to accommodate the wheels of the mower shown in Figure 1.

The catcher of the present invention is illustrated as used with a larger mower of the type ejecting the grass forwardly in the direction of travel. However, it may be used with any type mower. However, when used with smaller mowers of the type ejecting towards the rear, the catcher preferably will be mounted on the mower frame and also supported at its other end near the point 13 by a connection to the handle. The embodiment illustrated in Figure 1 has no side portions above the curved bottom portion 1'. However, side portions could be added there if desired.

In one embodiment of the invention the construction was of sheet metal of a single piece which was cut in a pattern and then folded into the desired shape, the outer edges being wrapped around the rod 5 at the top and the forward edge 15 being wrapped around the vertical rod 16. The rod 16 may extend under the bottom and up the other side where it is joined to the rod 5, for instance, by welding or other conventional methods. Alternatively, two vertical rods may be used, one on each side, each of which would extend through the bottom and be secured thereto by means of a nut or other fastening device.

The side rod 16 may be eliminated if not desired by extending the forward edge of the side portion up to the rod 5 and connecting it thereto. However, the use of the rod 16 is preferable to provide strength and rigidity.

The construction may be of two or more pieces, for instance, the curved portion on member 1' may be a separate piece fastened to the piece 1.

Therefore, the present invention provides a grass catcher of rigid integral construction which is adapted to be easily mounted and demounted and which is not subject to wearing out or rotting because of water damage. The present method of mounting provides a secure holding of the catcher in a predetermined position with a minimum of adjustment and eliminates the bouncing or flopping of the catcher which would tend to spill the contents or possibly damage the lawn.

We claim:

For use with a lawn mover having upstanding side frames, each having a hook on its upper portion and at least one cross member interconnecting said sides; a grass catcher having a bottom, sides and front end, the bottom extending rearwardly and terminating in an upwardly convex portion, said catcher having rearwardly extending rods attached to upper portions of said sides and having inturned and downwardly extending terminal portions, said inturned portions being adapted to have engagement with said hooks and said downwardly extending terminal portions being adapted to have contact with portions of said cross member to hold said catcher in suspended position.

References Cited in the file of this patent
UNITED STATES PATENTS

| | | |
|---|---|---|
| 421,370 | Kelley | Feb. 11, 1890 |
| 601,008 | Trisler | Mar. 22, 1898 |
| 621,445 | Campbell et al. | Mar. 21, 1899 |
| 877,299 | Curran | Jan. 21, 1908 |
| 1,039,355 | Boss | Sept. 24, 1912 |
| 1,076,014 | Boss | Oct. 21, 1913 |
| 1,816,980 | Lontz | Aug. 4, 1931 |
| 1,819,133 | Stegman et al. | Aug. 18, 1931 |
| 2,494,062 | Sherrow | Jan. 10, 1950 |